(12) United States Patent
Polcuch (10) Patent No.: US 10,862,408 B2
(45) Date of Patent: Dec. 8, 2020

(54) ELECTRIC MOTOR REGENERATED ENERGY MANAGEMENT METHOD

(71) Applicant: Parker-Hannifin Corporation, Cleveland, OH (US)

(72) Inventor: Eric Polcuch, Mission Viejo, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 59 days.

(21) Appl. No.: 16/364,550

(22) Filed: Mar. 26, 2019

(65) Prior Publication Data

US 2020/0021209 A1 Jan. 16, 2020

Related U.S. Application Data

(60) Provisional application No. 62/743,574, filed on Oct. 10, 2018, provisional application No. 62/696,929, filed on Jul. 12, 2018.

(51) Int. Cl.
*H02P 3/14* (2006.01)
*B60L 7/10* (2006.01)
*H02P 5/68* (2006.01)
*B60K 7/00* (2006.01)
*B60L 15/20* (2006.01)

(52) U.S. Cl.
CPC ............. *H02P 3/14* (2013.01); *B60K 7/0007* (2013.01); *B60L 7/10* (2013.01); *B60L 15/20* (2013.01); *H02P 5/68* (2013.01); *B60K 2007/0061* (2013.01)

(58) Field of Classification Search
CPC . H02P 3/14; B60K 7/0007; B60L 7/10; B64C 13/50
See application file for complete search history.

(56) References Cited

U.S. PATENT DOCUMENTS

| | | |
|---|---|---|
| 3,583,248 A | 6/1971 | Langenberg |
| 5,668,421 A | 9/1997 | Gladish |
| 6,121,174 A | 9/2000 | Yokoi et al. |
| 7,237,748 B2 | 7/2007 | Sullivan |
| 8,335,600 B2 | 12/2012 | Breit et al. |
| 9,190,942 B2 | 11/2015 | Polcuch |
| 9,482,183 B2 | 11/2016 | Maalioune et al. |
| 2007/0262735 A1* | 11/2007 | Lloyd ....................... H02P 5/74 318/87 |
| 2008/0281480 A1* | 11/2008 | Egami ..................... B60L 50/13 701/22 |
| 2009/0157234 A1* | 6/2009 | Breit ....................... B64C 13/50 701/3 |
| 2012/0013176 A1 | 1/2012 | Shepard et al. |

* cited by examiner

*Primary Examiner* — Cortez M Cook
(74) *Attorney, Agent, or Firm* — Renner, Otto, Boisselle & Sklar, LLP (57) ABSTRACT

A system and method of managing power for an electric motor drive system is provided, where at least two electric motor drives are connected to a common power bus, each of the electric motor drives connected to at least one electric motor. A voltage of the common power bus is monitored, and upon the voltage of the common power bus exceeding a prescribed threshold voltage it is determined which of the at least two electric motor drives is operating in a mode other than a regeneration mode. The electric motor drive operating in a mode other than a regeneration mode is commanded to drive the connected motor into a load to dissipate the regenerated energy.

18 Claims, 6 Drawing Sheets

ELECTRIC MOTOR REGENERATED ENERGY MANAGEMENT METHOD

RELATED APPLICATION DATA

This application claims priority of U.S. Provisional Application Nos. 62/696,929 filed on Jul. 12, 2018 and 62/743,574 filed on Oct. 10, 2018, each of which is incorporated herein by reference in its entirety.

FIELD OF INVENTION

The present invention relates to electric motor driven systems and, more particularly, to a method and apparatus for management of regenerated energy in such systems.

BACKGROUND OF THE INVENTION

Electric machines are reversible machines; they can function as motors or as generators/alternators. A motor receives electrical power from a power source and transforms the electrical power into torque, which opposes the power source. A generator/alternator receives mechanical power from a mechanical actuator and transforms the mechanical power into electrical power developing a counter torque, which opposes the actuator.

When a load becomes overhauling, e.g., when the load pulls a motor faster than its synchronous speed, the motor acts as an alternator that converts mechanical power to electrical power. A typical example of a regenerative application is an elevator. The motor is loaded as it lifts the elevator car and its contents. When traveling downward, however, the motor "holds back" on its descent (negative torque) and must have some place to deposit this regenerating energy.

Ideally, regenerated energy is provided back to the AC line, thereby reducing overall system power consumption. In some instances, however, it may not be feasible to provide the energy back to the AC line. In these situations, it becomes necessary to dissipate the regenerated energy by some other means.

One technique for dissipating regenerated energy in controlled electric motor driven systems is to engage a resistor across either the motor leads or the controller's DC bus, thereby dissipating excess energy as heat in the resistor. If large amounts of energy are to be dissipated in this fashion, very large resistors, large heat sinks and/or cooling must be employed to prevent excessively high resistor temperatures.

In U.S. Pat. No. 6,121,740 energy regenerated from an induction motor is first used to charge a battery. Once the battery is fully charged the induction motor is controlled to regenerate energy in a highly inefficient manner thus dissipating the energy as heat within the same controlled motor.

In U.S. Pat. No. 9,482,183 regenerated energy is rectified and then dissipated as heat through a resister. This is typical of current state-of-the-art (SOTA) except in current SOTA an H-bridge used to drive the motor is also used to create the DC power that is being dissipated in resistors.

SUMMARY OF THE INVENTION

A drawback to the typical SOTA methods for dissipating regenerated energy is that the resistors through which the energy is dissipated are typically large and heavy devices that add cost and weight to the system and require space. Further, these resistors may require heat sinks and/or other means for preventing resistor temperature from exceeding a prescribed threshold, thereby further adding to the cost, weight and size of the system.

In accordance with aspects of the present invention, in electric motor driven systems that have at least two motors where at least one motor is operating to absorb aiding load, i.e., regenerating power, and at least one motor is not operating with an aiding load, the regenerated power from the first motor is dissipated in the other motor(s) as heat. In this regard, the other motor(s) may be stalled by driving it/them into mechanical stops. Alternatively, the other motor(s) may also be operated to generate a braking torque that aids the first motor (e.g., to produce a braking torque that aids the braking torque of the regenerating motor while still absorbing the regenerating motor's excess energy.). Such systems include but are not limited to aircraft high-lift where the flaps and slats are operated sequentially, engine thrust reverser systems where multiple independent actuators or actuation systems are employed, and wheel drive systems required to slow down existing motion. Aspects of the invention are particularly suitable to applications in which the motors are controlled induction motors. However, the concept could also be applied to brushless DC, brushed DC and other motor types.

According to one aspect of the invention, an electric motor drive system powered by a common power bus includes: a first motor drive electrically coupled to the common power bus; a second motor drive electrically coupled to the common power bus, the second motor drive independently operable from the first motor drive; a first electric motor electrically connected to the first motor drive; a second electric motor electrically connected to the second motor drive; a sensor operatively coupled to the common power bus and operative to provide a bus voltage measurement of the common power bus; and a controller operatively coupled to the sensor to receive the bus voltage measurement and operatively coupled to the first and second motor drives to control operation of the respective first and second electric motors. The controller is configured to monitor the bus voltage measured by the sensor, upon the bus voltage exceeding a prescribed threshold voltage, determine which one of the first motor drive or second motor drive is operating in a mode other than a regeneration mode; and command the motor drive determined to be operating in a mode other than a regeneration mode to drive the connected motor into a load to dissipate regenerated energy.

Optionally, the controller is configured to command the motor drive operating in a mode other than regeneration mode to stall the connected motor by driving the connected motor into a fixed mechanical stop.

Optionally, the controller is configured to determine which one of the first motor drive or second motor drive is operating in a regeneration mode, and command the motor drive operating in a mode other than regeneration mode to produce a torque that absorbs the energy produced by the motor connected to the motor drive that is operating in a regeneration mode.

Optionally, the controller is configured to command the motor drive operating in a mode other than regeneration mode to drive the connected motor at a prescribed frequency.

Optionally, the controller is configured to modulate a voltage output by the motor drive operating in a mode other than regeneration mode to maintain the voltage of the common power bus at or below a prescribed voltage level.

Optionally, the controller is configured to command the motor drive operating in a mode other than regeneration mode to operate in a low-efficiency mode.

Optionally, the system includes at least one of: a first mechanical actuator drivingly coupled to the first electric motor and a second mechanical actuator drivingly coupled to the second electric motor; a first drive wheel drivingly coupled to the first electric motor and a second drive wheel drivingly coupled to the second electric motor; or a first engine thrust reverser device drivingly coupled to the first electric motor and a second engine thrust reverser device drivingly coupled to the second electric motor.

Optionally, the electric motor comprises an induction motor, and the controller is configured to command at least one of the first and second motor drives to drive the induction motor at a voltage and frequency that produces a slip greater than a slip at pull out.

Optionally, the first and second electric motors comprise at least one of an induction motor, a brushless DC motor, or a brushed DC motor.

According to another aspect of the invention, a method of managing power for an electric motor drive system that includes at least two electric motor drives connected to a common power bus, each of the electric motor drives connected to at least one electric motor is provided. The method includes: monitoring a voltage of the common power bus; upon the voltage of the common power bus exceeding a prescribed threshold voltage, determining which of the at least two electric motor drives is operating in a mode other than a regeneration mode; and commanding the electric motor drive operating in a mode other than a regeneration mode to drive the connected motor into a static load to dissipate regenerated energy.

Optionally, driving the connected motor into a load comprises driving the connected motor into a fixed mechanical stop to stall the motor.

Optionally, the method includes determining which one of the at least two electric motor drives is operating in a regeneration mode, and commanding the electric motor drive operating in a mode other than regeneration mode to produce a torque that absorbs the energy produced by the motor connected to the electric motor drive that is operating in a regeneration mode.

Optionally, commanding the electric motor drive operating in a mode other than a regeneration mode to drive the connected motor into a load to dissipate the regenerated energy includes commanding the at least one electric motor drive operating in a mode other than regeneration mode to output a voltage waveform at a prescribed frequency.

Optionally, commanding the electric motor drive operating in a mode other than a regeneration mode to drive the connected motor into a load to dissipate the regenerated energy includes commanding the at least one electric motor drive operating in a mode other than regeneration mode to modulate a voltage provided to the connected at least one motor to maintain the voltage of the common power bus at a prescribed voltage level.

Optionally, commanding the electric motor drive operating in a mode other than a regeneration mode to drive the connected motor into a load to dissipate the regenerated energy includes commanding the electric motor drive operating in a mode other than regeneration mode to drive the at least one motor operating in a mode other than regen mode in an inefficient operating mode.

Optionally, the method includes dissipating regenerated energy in a resistor bank when each of the at least two electric motor drives operate in the regeneration mode.

Optionally, the electric motor comprises an induction motor, the method further comprising commanding the electric motor drive operating in a mode other than a regeneration mode to drive the connected motor into a load to dissipate the regenerated energy to drive the induction motor at a voltage and frequency that produces a slip greater than one inducing plugging in the non-regenerating induction motor.

Optionally, each electric motor drive is operatively coupled to a common movable structure, each electric motor drive operative to control a torque applied to the common movable structure.

Optionally, the at least one motor coupled to a first electric motor drive of the at least two electric motor drives is operating in a regeneration mode, and the at least one motor coupled to a second electric motor drive of the at least two electric motor drives is operating in a plugging mode.

Optionally, the at least one motor operating in a plugging mode produces a torque that aids a torque produced by the at least one motor operating in a regeneration mode.

These and other features of the invention are more fully described and particularly pointed out in the description and claims set out below, and this Summary is not intended to identify key features or essential features of the claimed subject matter. The following description and claims and the annexed drawings set forth in detail certain illustrative embodiments of the invention, and these embodiments indicate but a few of the various ways in which the principles of the invention may be used.

DETAILED DESCRIPTION

The present invention is described in the context of systems driven by an AC induction motor, where the system includes at least two independent induction motor driven systems of one or more motors each. In such system, the speed and/or position control of the system relies on low-slip induction motors closely following a specified Volts per Frequency (V/F) profile in an open loop manner. It should be appreciated, however, that aspects of the invention have utility in other types of motor driven systems. For example, the invention is applicable to brushless DC motor driven systems as well as brushed DC motor driven systems and the like.

In some electro-mechanical systems, it can be advantageous to power a plurality of different motors from a common power source, such as a common AC or DC power bus. However, in certain situations energy may be regenerated (e.g., due to an overhauling load) and, thus, the regenerated energy must either be dissipated (e.g., as heat) or provided back to the main power source. In some situations, it may not be feasible to provide the regenerated energy back to the power source and thus other means may be required to dissipate the regenerated energy.

In accordance with the present invention, regenerated energy from a first group of one or more motors is dissipated in a second group of one or more motors. When the motors are AC induction motors, it may be preferable to drive motors receiving the regenerated power at a voltage and frequency that produces a slip greater than the slip at pull out. In this manner, the energy may be dissipated evenly between the rotor and stator of the second group of motors such that the energy can be dissipated without motor positional change and without applying excessive load to the holding device. This methodology allows the first set of motors to be controlled based on the volts per frequency scheme providing good speed and position accuracy while dissipating large amounts of regenerated energy.

In one embodiment, the second group of one or more motors is driven into a fixed mechanical stop. For example, the mechanical stop may be an end of travel stop or the like for a moveable member. In another embodiment, the second group of one or more motors may be driven into an application-specific load, e.g., for a wheel drive system the regenerated energy from one set of wheels can be dissipated in the induction motors on another set of wheels by providing the second set of wheels with voltage and frequency in the opposite direction, thus dissipating the energy regenerated due to the first set of wheels in the second set of wheels. Other possible applications include flaps/slats of an aircraft, aircraft thrust reverser systems, and the like.

Figure 1:
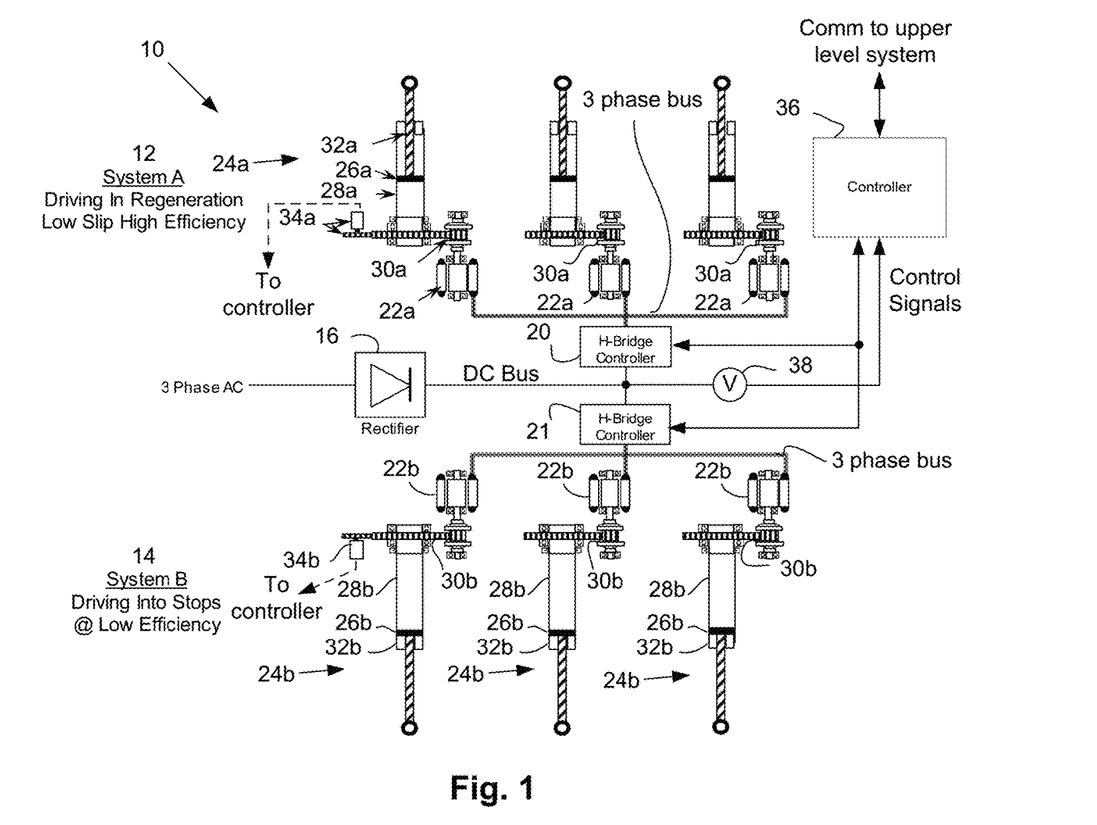
FIG. 1 is a simplified schematic diagram of an exemplary system for managing regenerated electric energy in accordance with the invention.

Referring now to FIG. 1, illustrated is an exemplary system 10 in accordance with the present invention. The system 10 includes a first drive system 12 and a second drive system 14 independently operable from the first drive system 12. Independently operable as used herein means that the motors from one group can be operated in a manner different from operation of motors of the other group, e.g., one motor group may be active while the other motor group may be inactive, one group of motors may be operating in a particular quadrant (e.g., CW rotation and motoring) while the other group of motors may be operating in a different quadrant (e.g., CW rotation and regenerating). Both drive systems 12 and 14 receive, such as rectified power via rectifier 16, which converts AC power to DC power. It is noted, however, that the drive systems may receive AC power in certain applications. The drive systems 12 and 14 provide the power to first and second motor drives 20, 21, such as H-bridge controllers. As is well known, an H-bridge controller is a device that enables power to be applied to a load, such as a motor, in opposite directions. Also, as used herein a motor drive is defined as a device that provides voltage and current to/from the motor in varying amounts and, in the case of AC drives, at varying frequencies, to control the motor's speed and torque. The first motor drive 21 provides power to a plurality of motors 22a, such as induction motors, each of which are electrically coupled to the output of the first motor drive 21. Similarly, the second motor drive 21 provides power to a plurality of motors 22b.

Each motor 22a, 22b is operative to effect motion of a respective movable member 24a, 24b, which in the example of FIG. 1 is formed by a traveling ball screw 26a, 26b and rotating drive tube 28a, 28b though other arrangements resulting in either a linear or a rotary output may be considered. The movable member 24a, 24b may be operatively connected to a specific device, such as a flight control surface of an aircraft (not shown) or other device. In effecting motion of the movable member 24a, 24b, a gear reducer 30a, 30b, such as a direct gear drive, a belt drive, etc. couples each motor 22a, 22b to a respective movable member 24a, 24b. For example, in the case of a movable member embodied as a ball screw each motor 22a, 22b is coupled to an input of a respective gear reducer 30a, 30b, and an output of the gear reducer 30a, 30b is coupled to the corresponding rotating drive tube 28a, 28b. As the motor 22a, 22b rotates, corresponding rotation of the rotating tube 28a, 28b is produced via the gear reducer 30a, 30b but at a speed reduced relative to that of the motor 22a, 22b. The rotating drive tube 28a, 28b is in threaded engagement with a respective traveling ball screw 26a, 26b, such that rotation of the drive tube causes axial motion of the ball screw. A mechanical dog stop 32a, 32b is fixed to each traveling ball screw and is operative to limit axial motion of the ball screw.

The system 10 may also include a position sensor 34a, 34b operatively coupled to the moveable member 24a, 24b and/or motor 22a, 22b in order to provide position data corresponding to a position of the moveable member 24a, 24b and/or to count a number of revolutions of the motor rotor. The position sensor 34a, 34b, which may be an encoder, a resolver, or any other sensor known in the art, may be directly or indirectly coupled to the movable member and/or the motor. For example, in FIG. 1 the position sensor 34a, 34b is directly coupled to the output of the gear reducer 30a, 30b (and thus indirectly coupled to the motor), although other coupling points may be utilized, e.g., an input to the gear reducer, a motor output shaft, the moveable member, etc. Position data from the position sensor 34a, 34b may be provided to a controller 36, which as described in more detail below performs a power management function for the overall system 10. The controller 36 may exchange control data with the motor drive 20, 21 as necessary to control operation of the system. Such data may include drive control information, drive status information, drive current, drive voltage and drive frequency information, drive health status information, and the like. A voltage sensor 38 is operatively coupled to the DC bus to measure the voltage on the DC bus, but may be coupled to other locations depending on the specific configuration of the system. Regardless of the measurement location, the measured voltage is provided to the controller 36.

Figure 2:
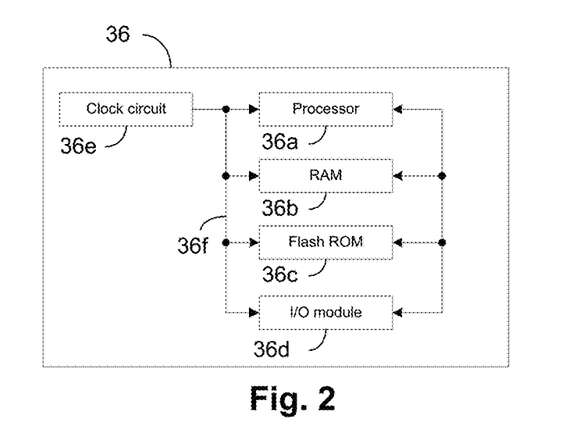
FIG. 2 is a block diagram of an exemplary controller that can be used to implement power management in accordance with the invention.

Referring briefly to FIG. 2, illustrated is a block diagram of an exemplary controller 36 that may be used in the system 10 of FIG. 1. The controller 36 may be a microcomputer in which a CPU (central processing unit) 36a, a RAM (random access memory) 36b, a flash ROM (read only memory) 36c, an input/output module 36d, a clock circuit 36e and the like are communicatively connected via a system bus 36f. The controller 36 is responsible for controlling components of the drive systems 12 and 14 in accordance with the present invention. The RAM 36b is mainly used as a work space, for example, for temporarily storing an intermediate result of processing. The flash ROM 36c stores, in advance, various programs to be executed by the CPU 36a and data to be used in processing. A power management program may be stored in the flash ROM 36c, the power management program being executable by the CPU 36a to carry out steps of a method in accordance with the invention. The I/O module 36d provides digital and/or analog input/output points for receiving and outputting data, while the clock circuit 26e can provide timing signals for the controller 36.

Figure 3:
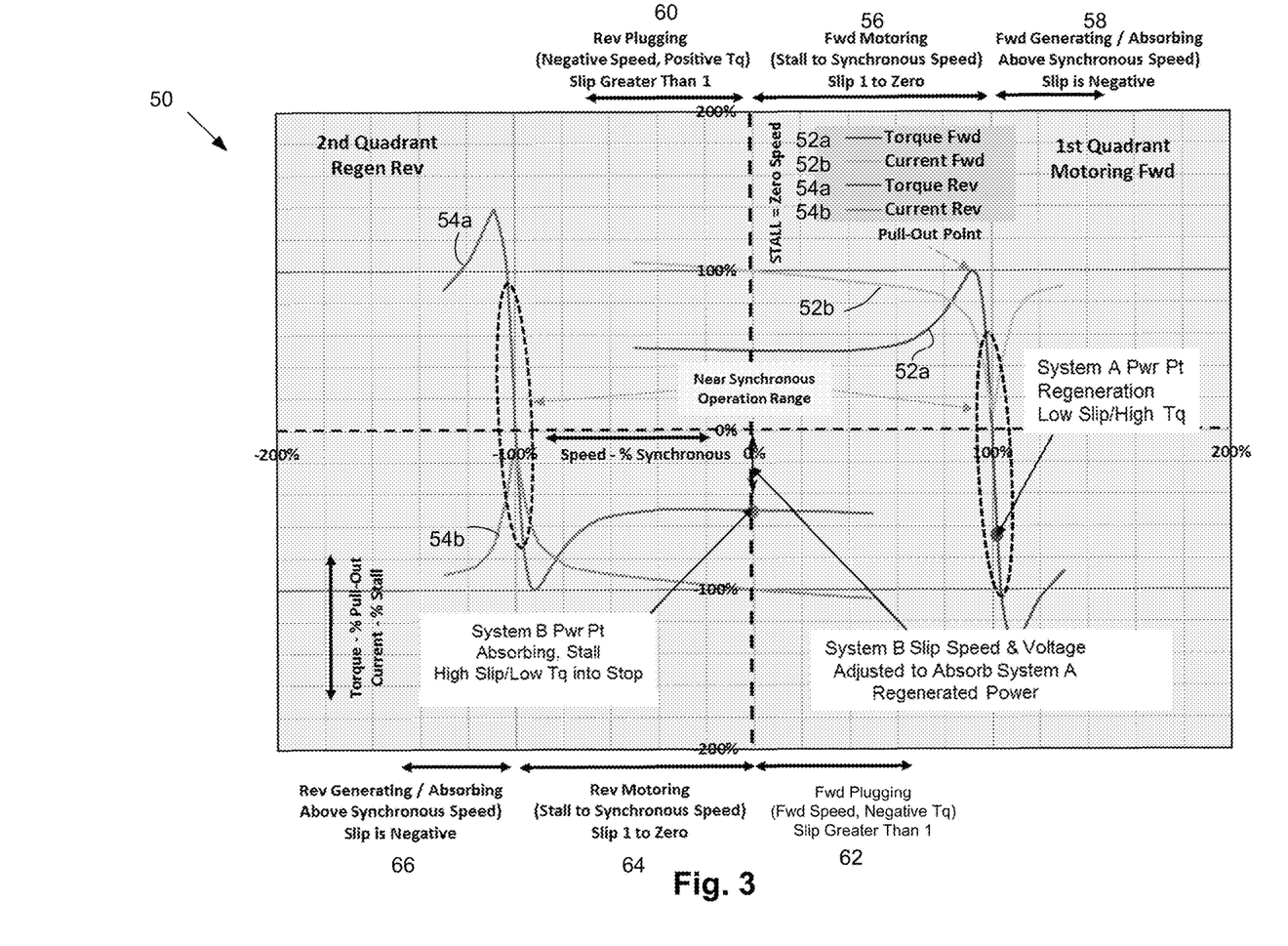
FIG. 3 is a graph showing operation of an induction motor driven into a mechanical stop to dissipate regenerated energy according to an embodiment of the present invention.

Referring briefly to FIG. 3, illustrated is a graph 50 for an exemplary induction motor that is driven into a mechanical stop in order to dissipate regenerated energy. The graph illustrates a forward motor torque curve 52a, a reverse motor torque curve 52b, a forward motor current curve 54a and a reverse motor current curve 54b versus speed (expressed as slip) for the exemplary motor. The curve of FIG. 3 helps identify the motoring, regenerating and plugging operation of the exemplary induction motor. In this regard, a first region 56 illustrates current and speed for motoring operation, where current is positive, speed varies between stall and synchronous speed, and slip is between 1 and zero. A second region 58 illustrates current and speed for forward generating/absorbing, where current is positive, speed is above the synchronous speed, and slip is negative. A third region 60 illustrates current and speed for reverse plugging, where current is positive, shaft speed is negative, and the voltage waveform rotation is positive and slip is greater than 1. A fourth region 62 illustrates current and speed for forward plugging, where current is positive, shaft speed is positive and the voltage waveform rotation is negative and slip is greater than 1. A fifth region 64 illustrates current and speed for reverse motoring, where both current and speed are negative and slip is between 1 and zero. A sixth region 66 illustrates current speed for reverse generating/absorbing, where current and speed are both negative and slip is negative.

Figure 4:
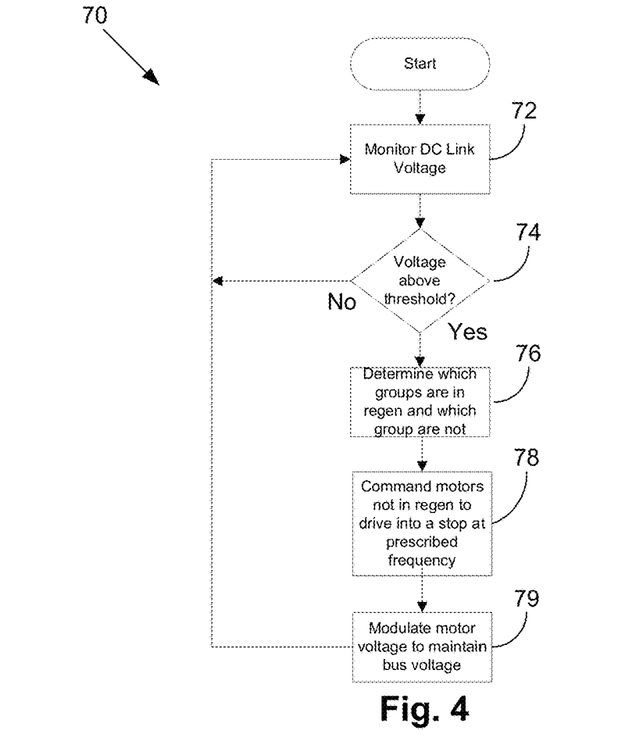
FIG. 4 is a flow chart illustrating exemplary steps of a method in accordance with the invention.
Figure 5:
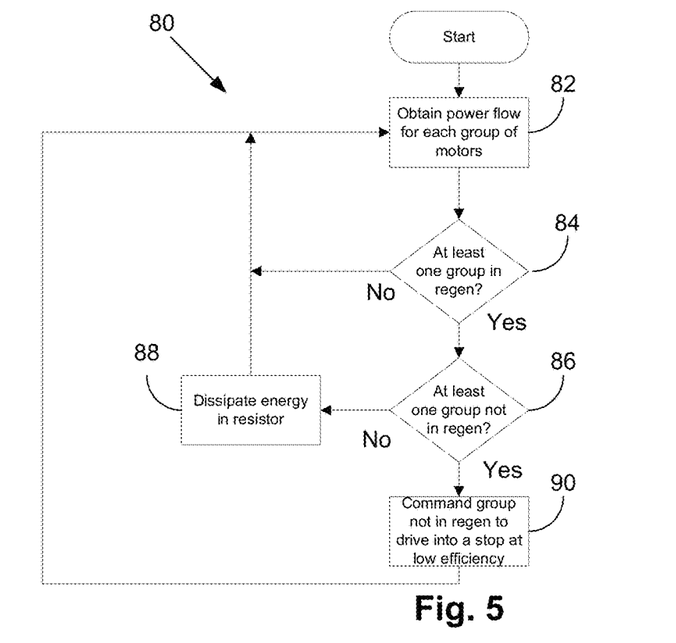
FIG. 5 is a flow chart illustrating exemplary steps of another method in accordance with the invention.

Referring now to FIGS. 4 and 5, illustrated flow diagrams 70 and 80 that depict exemplary steps for managing energy of the motor drive system 10 in accordance with the invention. Although the method descriptions and flow charts may show specific orders of executing steps, the order of executing the steps may be changed relative to the order described. Also, two or more steps described in succession may be executed concurrently or with partial concurrence. One or more of the described or illustrated steps may be omitted.

The exemplary methods of FIGS. 4 and 5 may be implemented using coded instructions (e.g., computer readable instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Typical non-transitory computer readable media include electronic memory devices, magnetic memory devices and optical memory devices. The method may be executed by a controller, such as controller 36. In one embodiment, to carry out the method, the logical instructions embodying the method are stored in flash memory 36c and executed by the processor 36a of the controller 36. Alternatively, the method may be at least partially implemented in hardware of the controller 36 (e.g., an application-specific integrated circuit (ASIC), analog circuitry, or the like).

The method 70 may begin at step 72 where a voltage of the common power bus is obtained and monitored by the controller 36. For example, and as previously discussed, voltage sensor 38 may measure the voltage of the power bus and provide the measurement to the controller 36 via the I/O module 36d. In this regard, the voltage sensor 38 may be wired to the I/O module 36d to provide to the controller 36 an analog signal corresponding to the bus voltage. Alternatively, the voltage sensor 38 may communicate data to the I/O module 36d via a wired serial communication link or via a wireless communication link.

Next at step 74 the controller 36 determines if the bus voltage is above a prescribed threshold voltage. For example, if the power bus has a nominal bus voltage of 250 volts DC and a threshold voltage level is set for ten percent, then the controller 36 may conclude that a high voltage condition is detected when the voltage sensor 38 indicates the power bus is at or above 275 volts. If the voltage is not above the threshold voltage, then the method moves back to step 72. However, upon the voltage of the common power bus exceeding the prescribed threshold voltage, the controller 36 determines which of the at least two electric motor drives 20, 21 is operating in a mode other than a regeneration mode as indicated at step 76. The controller 36 may make such determination based on communication link between the controller 36 and each motor drive 20, 21 (e.g., each motor drive may communicate various parameters and/or status bits to the controller 36, such as drive output current, drive output voltage, a motoring status bit, a motor slip, a regeneration status bit, etc., that can be used by the controller to ascertain the status of each motor drive). Such determination is made to identify which motor or group of motors will be dissipating the excess energy. For example, if the motors 22a are regenerating through motor drive 20 and motors 22b are idle, then the controller 36, via the communication link to each respective motor drive 20, 21, knows which group of motors will be dissipating the energy (in the present example, motors 22b will be dissipating the regenerated energy created by motors 22a).

Next at step 78, the controller 36 commands the motor drive that is in a mode other than regen mode to dissipate the regenerated energy. In this regard, the controller 36 may command the motor drive 20, 21 that is not in regeneration mode to drive the corresponding motors in a direction that stalls the motors, for example, by commanding the motors to drive the connected components into a fixed mechanical stop. Preferably, the motor drive outputs a waveform that does not produce high torque, e.g., for an induction motor the waveform may have a high frequency that does not produce excessive torque, and has a voltage that is equivalent to the output of the motor drive that is operating in regeneration mode such that the stalled motor draws the same amount of power as the motor that is regenerating, thereby keeping the DC link voltage at a constant value. Additionally or alternatively, the controller 36 may command the motor drive 20, 21 not operating in regeneration mode to operate at a prescribed frequency and voltage, to operate in an inefficient operating mode, and/or to produce a motor slip greater than a slip at pull out of the induction motor as indicated at step 79. The power absorbed by the motor is a function of slip and voltage. Thus, the voltage and frequency can be modulated to absorb the necessary power while not producing excessing torque. For example, the controller 36 may command the motor drive 20, 21 not operating in regeneration mode to operate at a high frequency and into a stall condition. In this scenario, the motor operates at a high slip and the power is absorbed and distributed between the rotor and stator. The method then moves back to step 72 and repeats.

Moving now to FIG. 5, illustrated is a flow diagram 80 depicting steps of a method in accordance with another embodiment of the present invention. Like the method of FIG. 4, the method of FIG. 5 may be executed by controller 36 or the like.

Beginning at step 82, the controller 36 determines the power flow for each motor drive 20, 21. This determination may be made, for example, based on data provided by each motor drive 20, 21 to the controller 36 via the communication link. Next at step 84 the controller 36 determines if at least one motor drive 20, 21 is operating in regeneration mode. If neither motor drive 20, 21 is operating in regeneration mode, then no action need be taken and the method moves back to step 82. However, if at least one motor drive 20, 21 is operating in regeneration mode, then the method moves to step 86.

At step 86 the controller 36 determines if at least one motor drive 20, 21 is not operating in regeneration mode. This determination again can be based on data communicated by each motor drive 20, 21 to the controller 36. If no motor drives 20, 21 are operating in a mode other than regeneration mode (i.e., all motor drives are operating in regeneration mode), then the regenerated energy cannot be dissipated by other motors and the method moves to step 88 where the energy is dissipated in a resistor bank. The method then moves back to step 82 and repeats.

Moving back to step 86, if at least one motor drive 20, 21 is not operating in regeneration mode, then the method moves to step 90 where the controller 36 commands the motor drive 20, 21 not operating in regeneration mode to drive the motors into a stop, thereby dissipating the excess energy. As in the method of FIG. 4, the controller 36 may command the motor drive 20, 21 that is not in regeneration mode to drive the corresponding motors in a direction that drives the motor into a stall, e.g., by driving it into a fixed mechanical stop. As in the method of FIG. 4, the motor drive 20, 21 preferably outputs a waveform having a high frequency that does not produce excessive torque, the waveform having a voltage that is equivalent to that of the motor drive operating in regeneration mode such that the stalled motor draws the same amount of power as the motor that is regenerating, thereby keeping the DC link voltage at a constant value. Additionally or alternatively, the controller 36 may command the motor drive 20, 21 not operating in regeneration mode to operate at a prescribed frequency and voltage, to operate in an inefficient operating mode, and/or to produce a motor slip greater than a slip at pull out of the induction motor. In this manner, the regenerated energy from one group of motors may be dissipated in another groups of motors as heat. The method then moves back to step 82 and repeats.

Figure 6:
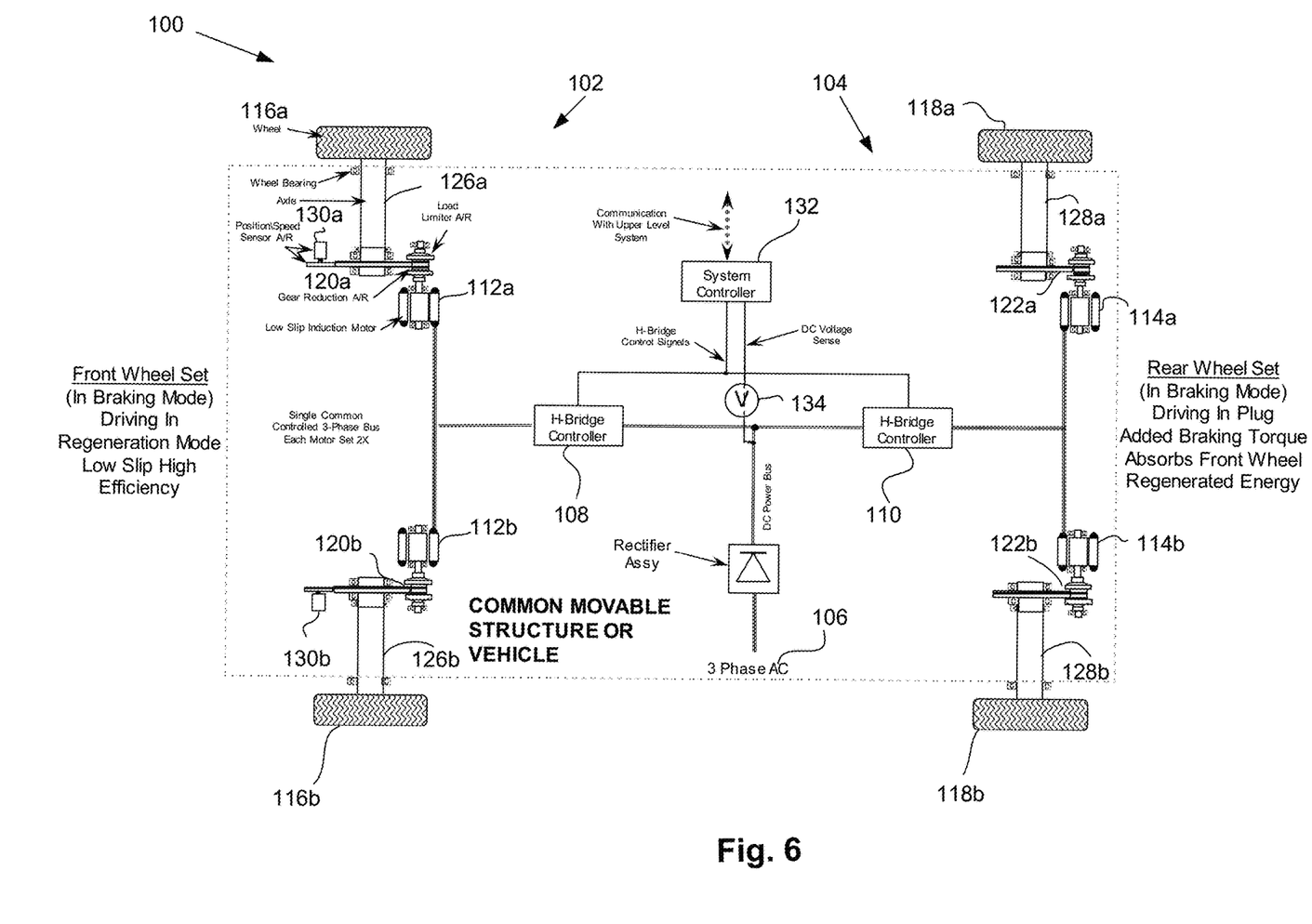
FIG. 6 is a simplified schematic diagram of another exemplary system for managing regenerated electric energy in accordance with the invention.

Referring now to FIG. 6, illustrated is another exemplary system 100 in accordance with the present invention. The system 100 is directed to a wheel drive system, where each wheel is coupled to a corresponding motor. More specifically, the system 100 includes a first drive system 102 and a second drive system 104 independently operable from the first drive system 102. Both drive systems 102 and 104 receive power, e.g., rectified power via rectifier 106, which converts AC power to DC power and provides the power to first and second motor drives 108, 110, such as H-bridge controllers. The first motor drive 108 provides power to a plurality of motors 112a, 112b, such as induction motors, each of which are electrically coupled to the output of the first motor drive 108. Similarly, the second motor drive 110 provides power to a plurality of motors 114a, 114b.

Each motor 112a, 112b, 114a, 114b is operative to effect motion of a respective wheel 116a, 116b, 118a, 118b. In effecting motion of the wheels 116a, 116b, 118a, 118b, a gear reducer 120a, 120b, 122a, 122b, such as a direct gear drive, a belt drive, etc. couples each motor 112a, 112b, 114a, 114b to a respective wheel. For example, each motor 112a, 112b, 114a, 114b is coupled to an input of a respective gear reducer 112a, 112b, 114a, 114b, and an output of each gear reducer is coupled to the corresponding wheel 116a, 116b, 118a, 118b via a drive axle 124a, 124b, 126a, 126b. As each motor 112a, 112b, 114a, 114b rotates, corresponding rotation of the respective axel 126a, 126b, 128a, 128b (and thus each wheel 116a, 116b, 118a, 118b) is produced via the gear reducer 120a, 120b, 122a, 122b but at a speed reduced relative to that of the respective motor.

The system 100 may also include a position sensor 130a, 130b operatively coupled to wheels 116a, 116b and/or motors 112a, 112b in order to provide position data corresponding to an angular position of the wheel and/or motor and/or to count a number of revolutions of the motor rotor. The position sensor 130a, 130b, which may be an encoder, a resolver, or any other sensor known in the art, may be indirectly coupled to the movable member and/or the motor. Position data from the position sensor 130a, 130b may be provided to a controller 132, which performs a power management function as described herein. The controller 132 may also exchange control data with the motor drive 108, 110 as necessary to control operation of the system. A voltage sensor 134 is operatively coupled to the DC bus to measure the voltage on the DC bus. The measured voltage is provided to the controller 132.

Operation of the system 100 is similar to the operation of the system 10. More particularly, the controller 132 executes the steps illustrated in FIG. 5 or 6 to manage the power of the system. For example, in a scenario in which the front wheels are regenerating due to an over-hauling load (e.g., the vehicle is traveling on a downward grade, the front and back wheels will both be rotating in the forward direction. However, the voltage waveform provided to the motors coupled to the rear wheels will be in the reverse direction (the rear motors will be plugging), which produces, in an inefficient manner, a negative torque to the rear motors such that the rear motors absorb the excess energy as heat.

Figure 7:
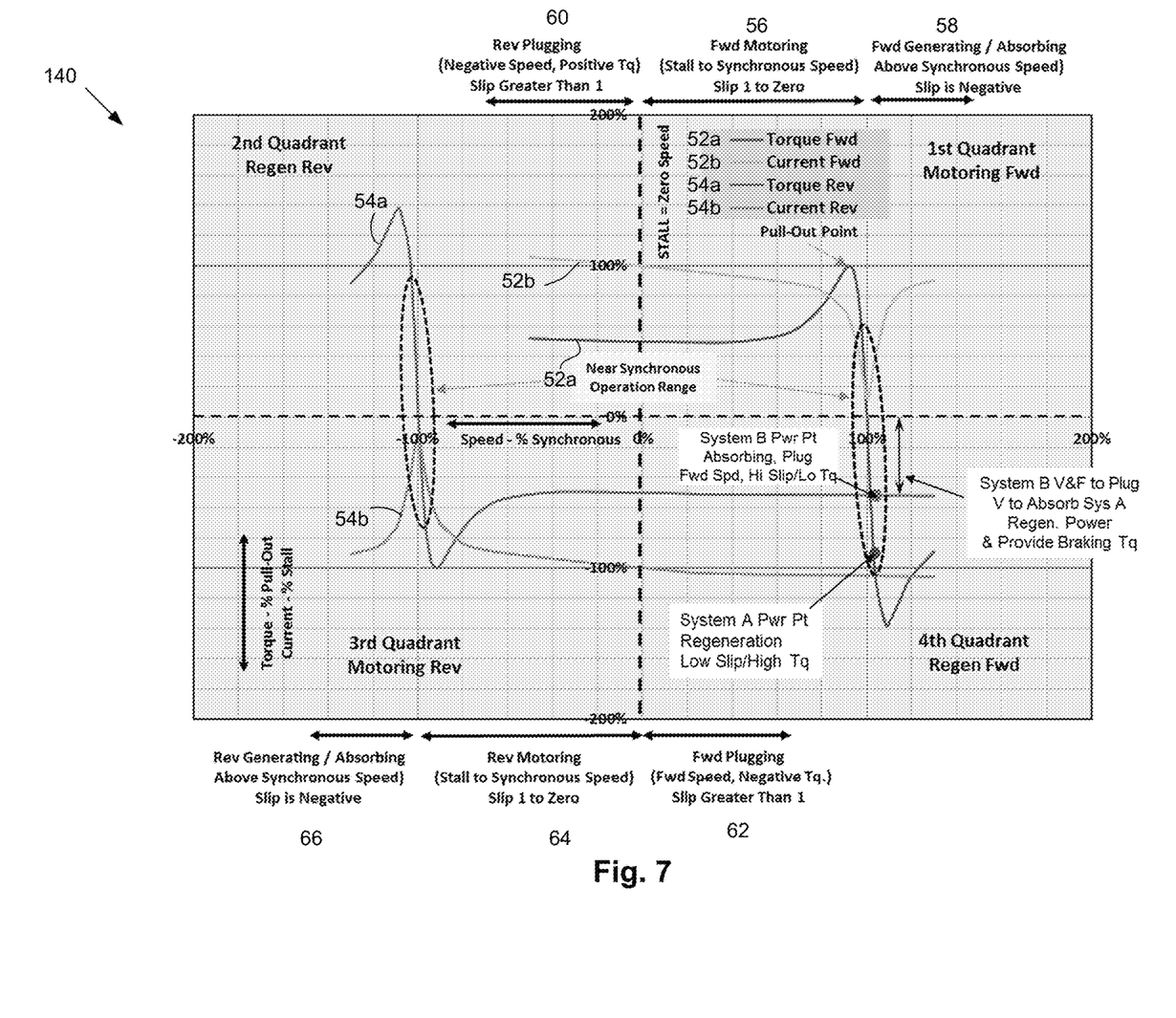
FIG. 7 is a graph showing operation of an induction motor operating in a plugging mode to dissipate regenerated energy according to an embodiment of the present invention.

Referring briefly to FIG. 7, illustrated is a graph 140 for an exemplary induction motor operating in a plugging mode to dissipate regenerated energy in accordance with an embodiment of the invention. As in FIG. 3, the graph of FIG. 7 illustrates a forward motor torque curve 52a, a reverse motor torque curve 52b, a forward motor current curve 54a and a reverse motor current curve 54b versus speed (expressed as slip) for the exemplary motor. The curve of FIG. 7 helps identify the motoring, regenerating and plugging operation of the exemplary induction motor. In this regard, a first region 56 illustrates current and speed for motoring operation, where current is positive, speed varies between stall and synchronous speed, and slip is between one and zero. A second region 58 illustrates current and speed for forward generating/absorbing, where current is positive, speed is above the synchronous speed, and slip is negative. A third region 60 illustrates current and speed for reverse plugging, where current is positive, shaft speed is negative, and the voltage waveform rotation is positive and slip is greater than 1. A fourth region 62 illustrates current and speed for forward plugging, where current is positive, shaft speed is positive and the voltage waveform rotation is negative and slip is greater than 1. A fifth region 64 illustrates current and speed for reverse motoring, where both current and speed are negative and slip is between 1 and zero. A sixth region 66 illustrates current speed for reverse generating/absorbing, where current and speed are both negative and slip is negative.

Accordingly, and in accordance with the invention, regenerated energy from one set of motors, region 58 (forward speed, negative torque, negative slip) can be dissipated in another set of plugged motors, region 62 (forward speed, negative torque, slip greater than 1) as heat. In this regard, the regenerated energy can be dissipated by driving the another set of motors, which are not regenerating energy, into another set of motors operating in a plugging mode.

Figure 8:
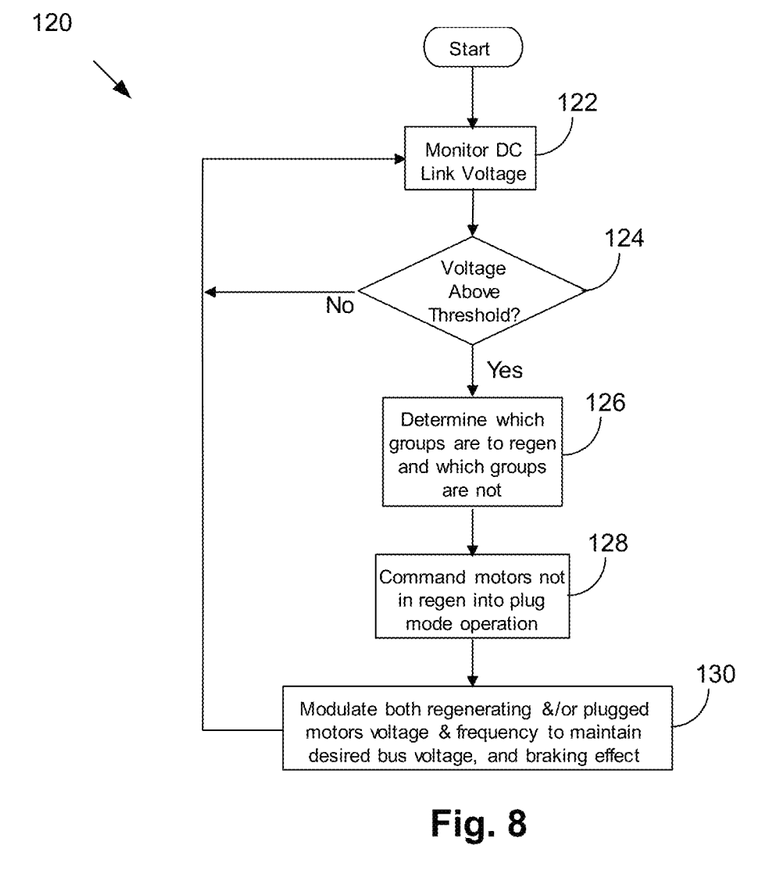
FIG. 8 is a flow chart illustrating exemplary steps of another method in accordance with the invention.

FIG. 8 illustrates another exemplary method 120 in accordance with the invention. Like the previously discussed methods, the method of FIG. 8 can be executed by the controller 36. The method 120 may begin at step 122 where a voltage of the common power bus is obtained and monitored by the controller 36. For example, and as previously discussed, voltage sensor 38 may measure the voltage of the power bus and provide the measurement to the controller 36 via the I/O module 36d. In this regard, the voltage sensor 38 may be wired to the I/O module 36d to provide to the controller 36 an analog signal corresponding to the bus voltage. Alternatively, the voltage sensor 38 may communicate data to the I/O module 36d via a wired serial communication link or via a wireless communication link.

Next at step 124 the controller 36 determines if the bus voltage is above a prescribed threshold voltage. If the voltage is not above the threshold voltage, then the method moves back to step 122. However, upon the voltage of the common power bus exceeding the prescribed threshold voltage, the controller 36 determines which of the at least two electric motor drives 108, 110 is operating in a mode other than a regeneration mode as indicated at step 126. The controller 36 may make such determination based on communication link between the controller 36 and each motor drive 108, 110 (e.g., each motor drive may communicate various parameters and/or status bits to the controller 36, such as drive output current, drive output voltage, a motoring status bit, a motor slip, a regeneration status bit, etc., that can be used by the controller to ascertain the status of each motor drive). Such determination is made to identify which motor or group of motors will be dissipating the excess energy.

Next at step 128, the controller 36 commands the motor drive(s) operating in a mode other than regeneration mode to dissipate the regenerated energy. In this regard, the controller 36 may command the motor drive 108, 110 that is not operating in regeneration mode to operate in plug mode. Then at step 130 the controller 36 commands the motor drive(s) operating in regeneration mode and the motor drive(s) operating in plugging mode to modulate a voltage and frequency output by the respective drives to maintain a desired bus voltage and to produce a braking effect. The method then moves back to step 122 and repeats.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An electric motor drive system powered by a common power bus, comprising:
   a first motor drive electrically coupled to the common power bus;
   a second motor drive electrically coupled to the common power bus, the second motor drive independently operable from the first motor drive;
   a first electric motor electrically connected to the first motor drive;
   a second electric motor electrically connected to the second motor drive;
   a sensor operatively coupled to the common power bus and operative to provide a bus voltage measurement of the common power bus; and
   a controller operatively coupled to the sensor to receive the bus voltage measurement and operatively coupled to the first and second motor drives to control operation of the respective first and second electric motors,
   the controller configured to:
   monitor the bus voltage measured by the sensor,
   upon the bus voltage exceeding a prescribed threshold voltage, determine which one of the first motor drive or second motor drive is operating in a mode other than a regeneration mode;
   command the motor drive determined to be operating in a mode other than a regeneration mode to drive the connected motor into a load to dissipate regenerated energy; and
   determine which one of the first motor drive or second motor drive is operating in a regeneration mode, and command the motor drive operating in a mode other than regeneration mode to produce a torque that absorbs the energy produced by the motor connected to the motor drive that is operating in a regeneration mode.

2. The system according to claim 1, wherein the controller is configured to command the motor drive operating in a mode other than regeneration mode to stall the connected motor by driving the connected motor into a fixed mechanical stop.

3. The system according to claim 1, wherein the controller is configured to command the motor drive operating in a mode other than regeneration mode to drive the connected motor at a prescribed frequency.

4. The system according to claim 1, wherein the controller is configured to modulate a voltage output by the motor drive operating in a mode other than regeneration mode to maintain the voltage of the common power bus at or below a prescribed voltage level.

5. The system according to claim 1, wherein the controller is configured to command the motor drive operating in a mode other than regeneration mode to operate in a low-efficiency mode.

6. An electric motor drive system powered by a common power bus, comprising:
   a first motor drive electrically coupled to the common power bus;
   a second motor drive electrically coupled to the common power bus, the second motor drive independently operable from the first motor drive;
   a first electric motor electrically connected to the first motor drive;

a second electric motor electrically connected to the second motor drive;
a sensor operatively coupled to the common power bus and operative to provide a bus voltage measurement of the common power bus; and
a controller operatively coupled to the sensor to receive the bus voltage measurement and operatively coupled to the first and second motor drives to control operation of the respective first and second electric motors,
the controller configured to:
monitor the bus voltage measured by the sensor,
upon the bus voltage exceeding a prescribed threshold voltage, determine which one of the first motor drive or second motor drive is operating in a mode other than a regeneration mode; and
command the motor drive determined to be operating in a mode other than a regeneration mode to drive the connected motor into a load to dissipate regenerated energy;
the system further comprising at least one of:
a first mechanical actuator drivingly coupled to the first electric motor and a second mechanical actuator drivingly coupled to the second electric motor;
a first drive wheel drivingly coupled to the first electric motor and a second drive wheel drivingly coupled to the second electric motor; or
a first engine thrust reverser device drivingly coupled to the first electric motor and a second engine thrust reverser device drivingly coupled to the second electric motor.

7. The system according to claim 1, wherein the electric motor comprises an induction motor, and the controller is configured to command at least one of the first and second motor drives to drive the induction motor at a voltage and frequency that produces a slip greater than a slip at pull out.

8. The system according to claim 1, wherein the first and second electric motors comprise at least one of an induction motor, a brushless DC motor, or a brushed DC motor.

9. A method of managing power for an electric motor drive system that includes at least two electric motor drives connected to a common power bus, each of the electric motor drives connected to at least one electric motor, the method comprising:
monitoring a voltage of the common power bus;
upon the voltage of the common power bus exceeding a prescribed threshold voltage, determining which of the at least two electric motor drives is operating in a mode other than a regeneration mode;
commanding the electric motor drive operating in a mode other than a regeneration mode to drive the connected motor into a static load to dissipate regenerated energy; and
determining which one of the at least two electric motor drives is operating in a regeneration mode, and commanding the electric motor drive operating in a mode other than regeneration mode to produce a torque that absorbs the energy produced by the motor connected to the electric motor drive that is operating in a regeneration mode.

10. The method according to claim 9, wherein driving the connected motor into a load comprises driving the connected motor into a fixed mechanical stop to stall the motor.

11. The method according to claim 9, wherein commanding the electric motor drive operating in a mode other than a regeneration mode to drive the connected motor into a load to dissipate the regenerated energy includes commanding the at least one electric motor drive operating in a mode other than regeneration mode to output a voltage waveform at a prescribed frequency.

12. The method according to claim 9, wherein commanding the electric motor drive operating in a mode other than a regeneration mode to drive the connected motor into a load to dissipate the regenerated energy includes commanding the at least one electric motor drive operating in a mode other than regeneration mode to modulate a voltage provided to the connected at least one motor to maintain the voltage of the common power bus at a prescribed voltage level.

13. The method according to claim 9, wherein commanding the electric motor drive operating in a mode other than a regeneration mode to drive the connected motor into a load to dissipate the regenerated energy includes commanding the electric motor drive operating in a mode other than regeneration mode to drive the at least one motor operating in a mode other than regen mode in an inefficient operating mode.

14. The method according to claim 9, further comprising dissipating regenerated energy in a resistor bank when each of the at least two electric motor drives operate in the regeneration mode.

15. The method according to claim 9, wherein the electric motor comprises an induction motor, the method further comprising commanding the electric motor drive operating in a mode other than a regeneration mode to drive the connected motor into a load to dissipate the regenerated energy to drive the induction motor at a voltage and frequency that produces a slip greater than one inducing plugging in the non-regenerating induction motor.

16. The method according to claim 9, wherein each electric motor drive is operatively coupled to a common movable structure, each electric motor drive operative to control a torque applied to the common movable structure.

17. The method according to claim 16, wherein the at least one motor coupled to a first electric motor drive of the at least two electric motor drives is operating in a regeneration mode, and the at least one motor coupled to a second electric motor drive of the at least two electric motor drives is operating in a plugging mode.

18. The method according to claim 17, wherein the at least one motor operating in a plugging mode produces a torque that aids a torque produced by the at least one motor operating in a regeneration mode.

* * * * *